United States Patent
Coulson

[15] 3,691,250
[45] Sept. 12, 1972

[54] 2-METHYL-3-METHYLENE-1,5,7-OCTATRIENE, ITS OLIGOMETER, AND ITS PREPARATION FROM ALLENE AND BUTADIENE WITH PALLADIUM(O) CATALYSTS

[72] Inventor: Dale Robert Coulson, Wilmington, Del.

[73] Assignee: E. I. du Pont de Nemours and Company, Wilmington, Del.

[22] Filed: March 9, 1971

[21] Appl. No.: 122,537

[52] U.S. Cl..............................260/677 R, 260/666 B
[51] Int. Cl...............................................C07c 11/02
[58] Field of Search.......................................260/677

[56] References Cited

UNITED STATES PATENTS 3,325,555   6/1967   Gebura......................260/677
3,444,258   5/1969   Kohnle et al. .............260/677
3,522,321   7/1970   De Young..............260/666 B Primary Examiner—Delbert E. Gantz
Assistant Examiner—J. Nelson
Attorney—James H. Ryan

[57] ABSTRACT

The tetraene 2-methyl-3-methylene-1,5,7-octatriene in both cis and trans forms is obtained by liquid-phase reaction between allene and butadiene in the presence of a Pd(O) complex catalyst. The tetraene readily forms an oligomer useful as a vehicle in air-dried finishes.

5 Claims, No Drawings

2-METHYL-3-METHYLENE-1,5,7-OCTATRIENE, ITS OLIGOMETER, AND ITS PREPARATION FROM ALLENE AND BUTADIENE WITH PALLADIUM(O) CATALYSTS

BACKGROUND OF THE INVENTION

1. Field of the Invention

This invention relates to, and has as objects provisions of, the reaction of allene with butadiene in the presence of a palladium(O) complex catalyst and the tetraene product, cis- and trans-2-methyl-3-methylene-1,5,7-octatriene, obtained thereby. Oligomers of the tetraene are also provided.

2. Prior Art

No prior disclosure is known of the subject product and process. Certain compounds related to 2-methyl-3-methylene-1,5,7-octatriene and their preparation by processes different from the present are described in the literature, e.g.;

a. Butler and Raymond, J. Macromol. Chem. 1, 201 (1966), describes polymerization with a Ziegler-type catalyst system of certain tetraenes, including 3,6-dimethylene-1,7e-octadiene. The polymers are said to have a cyclic-type structure.

b. Butler and Raymond, J. Org. Chem. 30, 2410 (1965), describes the synthesis of 3,6-dimethylene-1,7-octadiene by dehalogenative coupling of 2-(bromomethyl)butadiene with magnesium. Preparation of 1,3,9,11-dodecatetraene and 1,3,6,8-nonatetraene by the Wittig synthesis is also disclosed.

c. Miginiac, Ann. Chem. (Paris) 7, 445 (1962), reports the preparation of 1,3,7,9-decatetraene by dehalogenative coupling of 1-bromo-2,4-pentadiene with magnesium.

d. Gebura, U.S. Pat. No. 3,325,555 (1967), discloses and claims tetraenes of the formula

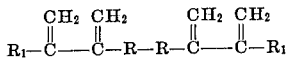

in which each R, independently, is a one to 20 carbon alkyl (sic) radical and each $R_1$, independently, is a one to four carbon alkyl radical.

e. Stille and Plummer, J. Org. Chem. 26, 4026 (1961), discusses, and contains additional references to, polymerization of tetraenes by the Diels-Alder reaction. Polymerizations of certain biscyclopentadienes are specifically described.

DESCRIPTION AND DETAILS OF THE INVENTION

In the present invention, cis- and trans-2-methyl-3-methylene-1,5,7-octatriene is prepared according to the equation:

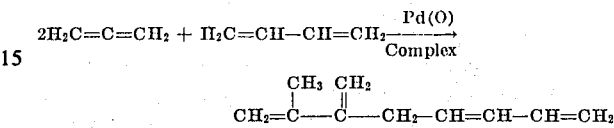

The reaction is carried out by mixing the reactants and catalyst under liquid phase conditions.

The process can be operated at temperatures in the range of about 100° C. to about 150° C., and pressure is not critical except as necessary to keep the reactants in the liquid phase. Pressures up to about 500 psig are considered sufficient, though higher pressures could be used if desired.

As is evident from the equation above, the present reaction takes place with a stoichiometrical allene:butadiene molar ratio of 2:1. Formation of the tetraene apparently is favored by low allene:butadiene mole ratios. The process is operable with allene:butadiene mole ratios in the range of about 1:10 to about 10:1, ratios in the range of about 1:3 to 2:1 being preferred.

The palladium(O) complex catalysts necessary for the invention are apparently unique, since other palladium catalysts, including the free metal, have been found inoperable. Any palladium(O) complex is regarded as suitable in the reaction. Several can, of course, be used simultaneously but to no advantage. The catalysts of the examples given below are bis(triphenylphosphine)(maleic anhydride)palladium(O) and tetrakis(triphenylphosphine)palladium(O). Representative operable equivalents are listed in the Table which follows.

TABLE

| Name | Formula | | Ref.*1 |
|---|---|---|---|
| Tetrakis(triphenylphosphine)palladium(O) | Pd[(C₆H₅)₃P]₄ | | |
| Bis(triphenylphosphine)-(maleic anhydride)palladium(O) | Pd[(C₆H₅)₃P]₂ | [HC—C(=O)—O—C(=O)—CH structure] | 2 |
| Bis(triphenylphosphine)-(dimethyl fumarate)palladium(O) | Pd[(C₆H₅)₃P]₂ | [CH₃OC(=O)—CH=CH—C(=O)OCH₃ structure] | 2 |
| Bis(triphenylphosphine)-(dimethyl maleate)palladium(O) | Pd[(C₆H₅)₃P]₂ | [HC—COOCH₃ / HC—COOCH₃ structure] | 2 |
| Bis[1,2-bis(dimethylphosphino)-ethane]palladium(O) | Pd[(CH₃)₂PCH₂CH₂P(CH₃)₂]₂ | | 3 |

TABLE—Continued

| Name | Formula | Ref.* |
|---|---|---|
| Bis[o-bis(diethylphosphino)-benzene]palladium(O) | Pd[structure with P(C₂H₅)₂ groups on benzene]₂ | 3 |
| Bis[bis(diphenylphosphino)-methane]palladium(O) | Pd[(C₆H₅)₂PCH₂P(C₆H₅)₂]₂ | 3 |
| Bis[1,2-bis(diphenylphosphino)-ethane]palladium(O) | Pd[(C₆H₅)₂PCH₂CH₂P(C₆H₅)₂]₂ | 3 |
| Bis[o-bis(dimethylarsino)-benzene]palladium(O) | Pd[structure with As(CH₃)₂ groups on benzene]₂ | 3 |

*References:
1. Malatesta et al., J. Chem. Soc., 1957, 1186.
2. Takahashi, et al., Nippon Kagaku. Zasshi 88, 1306 (1967).
3. Chatt et al., J. Chem. Soc. 1962, 2537.

Palladium(O) catalysts which promote the formation of 2-methyl-3-methylene-1,5,7-octatriene from allene and butadiene can also promote side reactions, e.g., linear dimerization of butadiene to 1,3,7-octatriene [Takahashi et al., Bull Chem. Soc. (Japan) 41, 454 (1968); Chem. Abs. 69, 35305e (1968)]. Such side reactions might involve conversion of primary tetraene product to unknown secondary products. Accordingly, optimum production of 2-methyl-3-methylene-1,5,7-octatriene in the process is a very complex question but has not been explored. In view of evidence that the presence of a relatively high molar proportion of the catalyst can result in a product containing no identifiable 2-methyl-3-methylene-1,5,7-octatriene, it is considered impractical to use catalyst in a molar ratio of catalyst:allene-plus-butadiene greater than about 1:200, i.e., a "catalytic amount." The preferred catalyst:allene-plus-butadiene molar ratios are in the range of about 1:500 to about 1:5,000.

The 2-methyl-3-methylene-1,5,7-octatriene product of the invention comprises a mixture of the cis and trans stereoisomers, which can be thermally oligomerized to an essentially nonvolatile viscous liquid oligomer. The oligomer, also a product of the invention, is a polyunsaturated oil which is useful as a vehicle in air-dried finishes, such as a clear varnish or a pigmented oil paint for protecting or decorating wood surfaces.

EMBODIMENTS OF THE INVENTION

The process of preparing 2-methyl-3-methylene-1,5,7-octatriene from allene and butadiene, thermal oligomerization of the tetraene, and use of the oligomer in air-drying varnishes are described in the following examples. In these examples, temperatures are in degrees Centigrade and percentages are by weight.

EXAMPLE 1

2-Methyl-3-methylene-1,5,7-octatriene

A solution of 1.47 g (2 mmole) of bis(triphenylphosphine)(maleic anhydride)palladium(O) in 100 ml of tetrahydrofuran was charged to a 400 ml stainless steel-lined autoclave. The closed system was cooled and evacuated to ~ 20 mm pressure. To this was then added 20 g (500 mmole) of allene and 108 g (2,000 mmole) of butadiene. The autoclave was heated to 120° for 6 hours. The resulting clear yellow-red solution was distilled directly giving 8.31 g (24 percent yield, based on allene charged) of a 2:1 mixture of trans- and cis-2-methyl-3-methylene-1,5,7-octatriene, b.p. 55–56.5/7.8 mm.

Anal. Calc'd. for $C_{10}H_{14}$: C, 89.50; H, 10.51
Found: C, 89.60; H, 10.60

Nmr (220 MHz, CCl₄): δ 1.88 ppm ($s$, $H^1$); 2.97 ($d, j = $ 7Hz, $H^f$, $H^g$, trans-isomers); 3.08 ($d, j = $ 7Hz, $H^f$, $H^g$, cis-isomer); 4.82–5.20 ($m$, $H^a$, $H^b$, $H^h$, $H^i$, $H^j$, $H^k$); 5.40–6.65 ($m$, $H^c$, $H^d$, $H^e$, $j_{c,d} = $ 9 Hz, $j_{c,d} = $ 14 Hz).

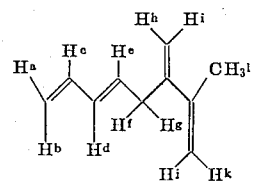

cis    trans

Infrared (neat): 1,595 cm⁻¹, 1,630 cm⁻¹ and 1,650 cm⁻¹
Ultraviolet (EtOH): $\lambda_{max} = $ 225 M$\mu$, $\epsilon = $ 35,600

The identity of 2-methyl-3-methylene-1,5,7-octatriene obtained by the process of Example 1 was confirmed by the following experiment:

A mixture of cis- and trans-2-methyl-3-methylene-1,5,7-octatriene (1.34 g, 97 percent purity) and 5 percent palladium on carbon (0.1 g) of ethanol (10 ml) was exposed to a hydrogen atmosphere with stirring. The mixture absorbed a total of 944 ml of hydrogen. This corresponds to 3.90 double bond equivalents. The mixture was filtered and evaporated of ethanol giving a colorless liquid. Purification of the major component (87 percent) by gas-liquid chromatography gave a liquid whose infrared spectrum was identical to that of known 2,3-dimethyloctane.

A gas chromatographic analysis procedure for 2-methyl-3-methylene-1,5,7-octatriene in crude reaction mixtures obtained by the process of Example 1 was established as follows:

A solution of allene, butadiene, and bis(triphenylphosphine)(maleic anhydride)palladium(O) in 25 ml of tetrahydrofuran was heated to 120° for 6 hours in an 80 ml stainless steel-lined bomb. The resulting solution was analyzed by gas-liquid chromatography and compared with a standard solution of distilled 2-methyl-3-methylene-1,5,7-octatriene in tetrahydrofuran. The analysis conditions found most suitable involved a 20 percent silicon gum nitrile column material on 60–80 mesh "Chromosorb" W. The column was 8 feet × ¼ of an inch in dimensions and the temperature used was 80°.

EXAMPLES 2–9

The effect of mole ratio of reactants on yield of 2-methyl 3-methylene-1,5,7-octatriene(I) is illustrated in the results of a series of runs with allene, butadiene and bis(triphenylphosphine)(maleic anhydride)palladium(O) catalyst in 25 ml of tetrahydrofuran heated to 120° for 6 hours in an 80 ml stainless steel-lined bomb. The data for these examples are presented in Table 2. The yield data are based on gas chromatographic analyses of the crude reaction products.

TABLE 2

| Example | mmole of Allene | mmole of Butadiene | mmole of Catalyst | % Yield of I[a] |
|---|---|---|---|---|
| 2 | 250 | 125 | 0.5 | 25 |
| 3 | 250 | 125 | 2.0 | none |
| 4 | 250 | 250 | 0.5 | 32 |
| 5 | 250 | 375 | 0.5 | 40 |
| 6 | 125 | 250 | 0.5 | 55 |
| 7 | 125 | 375 | 0.25 | 33 |
| 8 | 125 | 375 | 0.5 | 47 |
| 9 | 125 | 375 | 1.0 | 11 |

[a]Based on the amount of allene charged.

EXAMPLES 10–13

The effect of different solvents on yield of 2-methyl-3-methylene-1,5,7-octatriene(I) is illustrated in the data presented in Table 3. Each reaction mixture contained 32.5 g (600 mmole) of butadiene, 4 g (100 mmole) of allene, 0.18 g (0.25 mmole) of bis(triphenylphosphine)(maleic anhydride)palladium(O) catalyst and 25 ml of solvent. Each mixture was contained in an 80 ml stainless steel-lined bomb and was heated to 120° for 5 hours. The yields are based on gas chromatographic analyses of the crude reaction products.

TABLE 3

| Example | Solvent | % Yield of I[a] |
|---|---|---|
| 10 | Acetonitrile | 36.8 |
| 11 | Methanol | 5.7 |
| 12 | Chloroform | 0 |
| 13 | Benzene | 35.0 |

[a]Based on the amount of allene charged.

EXAMPLE 14

2-Methyl-3-methylene-1,5,7-octatriene

A solution of 1.47 g (2 mmoles) of bis(triphenylphosphine)(maleic anhydride)palladium(O) in 25 ml of tetrahydrofuran was charged to a 400 ml stainless steel-lined autoclave. The closed system was cooled to approximately −50° and evacuated to approximately 20 mm pressure. To this system was then added 162 g (3,000 mmole) of butadiene and 20 g (500 mmole) of allene. The autoclave was heated to 120° for 5 hours. The resulting solution was analyzed by gas-liquid chromatography. An 81 percent yield of a mixture of cis- and trans-2-methyl-3-methylene-1,5,7-octatriene, I, was found. Distillation on an 18 inch spinning band column afforded 13.0 g (39 percent yield, based on allene) of I. The recovered yield of I was low because of the difficulty in separation from impurities.

This example illustrates that the process of Example 1 is capable of producing the tetraene product in high yield, and that isolation of the product is difficult. The principal impurity is a linear dimer of butadiene, 1,3,7-octatriene.

EXAMPLE 15

2-Methyl-3-methylene-1,5,7-octatriene

A solution of tetrakis(triphenylphosphine)palladium(O) (1.16 g, 1 mmole) in 20 ml tetrahydrofuran was charged to an 80 ml stainless steel-lined autoclave. Butadiene (32.4 g, 600 mmoles) and allene (4 g, 100 mmoles) were also charged to the vessel under pressure. The autoclave was then heated to 120° for 5 hrs. The resulting solution was analyzed by gas-liquid chromatography for the presence of cis- and trans-2-methyl-3-methylene-1,5,7-octatriene. The analysis indicated a yield of 1.7 percent, based on the amount of allene charged.

EXAMPLE 16

Oligomerization of 2-Methyl-3-methylene-1,5,7-octatriene

A. A solution of cis- and trans-2-methyl-3-methylene-1,5,7-octatriene (4 g) and hydroquinone (0.01 g) in benzene (20 ml) was heated to 190° for 5 hrs. The resulting solution was evaporated to dryness at 0.2 mm pressure. The residue weighed 2.57 g and was clear viscous liquid.

Nmr analysis of the material revealed an aliphatic proton:olefinic proton ratio of 2.45. Propagation of a chain by any single bond of 2-methyl-3-methylene-1,5,7-octatriene would have given this ratio a maximum value of 1.33. Also, the ratio of terminal olefinic protons to internal olefinic protons was found to be 0.8. In the parent monomer this latter ratio is 2.0. Thus, the involvement of terminal methylenes in the oligomerization is suggested. All of this evidence is consistent with a Diels-Alder oligomerization as follows:

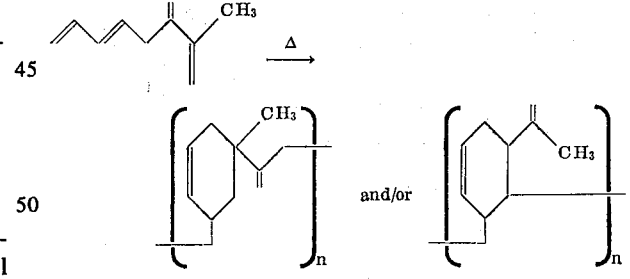

The value of $n$ in the oligomer (a low-molecular weight homopolymer) is probably between 2 and 3 as judged by the molecular weight of 329 found by cryoscopic measurements in benzene.

B. A sample of the above oligomer was spread out on a microscope slide and allowed to stand. After 3 days at room temperature a clear, colorless hard coating resulted.

C. A solution of 1.4 g of the oligomer and 0.10 ml of Noudex (a commercial drying agent containing cobalt naphthenate [6 percent cobalt content] in a hydrocarbon vehicle, prepared by Tenneco Chemicals, Inc., Noudex Div.) in 4 ml of benzene was prepared. This solution was applied with a brush to a 4 × 6 inch glass plate and a white pine surface (12 × 2 inch), respectively. After standing for 2½ hours at room temperature, hard clear coatings adhered strongly to both surfaces. Further standing enhanced the hardness.

The hard bright coatings on glass or wood are decorative as they are formed and protect against scratching. Addition of pigment or inert protectant (e.g., $TiO_2$) to the vehicle enables substantially any color or any protective agent desired to be applied to a surface.

Since obvious modifications and equivalents will be evident to those skilled in the chemical arts, I propose to be bound by the following claims.

The embodiments of the invention in which an exclusive property or privilege is claimed are defined as follows:

1. 2-Methyl-3-methylene-1,5,7-octatriene.
2. The process of preparing the compound of claim 1 which comprises reacting allene with butadiene in liquid phase and in the presence of a catalyst of a palladium(O) complex the said palladium (O) complex catalyst having a catalyst to allene and butadiene molar ratio of about 1:200 to about 1:5,000.
3. The process of claim 2 employing an inert diluent.
4. The process of claim 2 wherein the complex is bis(triphenylphosphine)(maleic anhydride)palladium(O).
5. The process of claim 2 wherein the complex is tetrakis(triphenylphosphine)palladium(O).

* * * * *